United States Patent [19]

Buzzi

[11] 3,997,177

[45] Dec. 14, 1976

[54] COLLET CHUCK WHICH CAN BE CENTERED RELATIVE TO ONE OR MORE AXES OF THE WORKPIECE TO BE MACHINED AND SUITABLE FOR MACHINE TOOLS

[75] Inventor: Ugo Buzzi, Agno, Switzerland

[73] Assignee: Albe S.A., Agno, Switzerland

[22] Filed: Nov. 12, 1975

[21] Appl. No.: 631,050

Related U.S. Application Data

[62] Division of Ser. No. 509,224, Sept. 25, 1974, Pat. No. 3,934,890.

[52] U.S. Cl. .................................. 279/16; 279/50; 33/181 R
[51] Int. Cl.[2] ........................................ B23B 31/20
[58] Field of Search ...................... 279/16, 17, 50; 33/181 R; 287/12, 119 R, 124, 126; 82/33 A

[56] References Cited

UNITED STATES PATENTS 3,421,770   1/1969   Benjamin et al. .................... 279/16
3,567,235   3/1971   Wiederkehr .......................... 279/16

Primary Examiner—Frank T. Yost
Attorney, Agent, or Firm—Young & Thompson

[57] ABSTRACT

A collet chuck which can be centered relative to an axis of the workpiece to be machined and suitable for machine tools in general and in particular machine tools having a number of successive positions. An inner prehensile member is capable of gripping the workpiece, and an intermediate member coaxial to the first has a conical seating which slides axially causing the prehensile member to close on the workpiece to be machined. An outer casing is rigidly attached to the prehensile member by means of a pin, and an outer ring is fitted with radial play around the periphery of outer casing. Spring members of variable tension compress the outer casing and outer ring against each other to lock them together by friction, and pusher means operable axially by a thrust member unlock the outer casing and the outer ring.

6 Claims, 5 Drawing Figures

COLLET CHUCK WHICH CAN BE CENTERED RELATIVE TO ONE OR MORE AXES OF THE WORKPIECE TO BE MACHINED AND SUITABLE FOR MACHINE TOOLS

This is a division, of application Ser. No. 509,224, filed Sept. 25, 1974, now U.S. Pat. No. 3,934,890, issued Jan. 27, 1976.

The present invention consists of a collet chuck which can be centred relative to one or more axes of the work piece to be machined, and suitable for machine tools in general and in particular machine tools with a number of successive machine positions (transfer).

It is well known that with machine tools with a number of successive machine positions there frequently arises the problem of ensuring quickly and accurately, to a tolerance of a few thousandths of a millimeter, the centring of the work piece to be machined relative not to the outer cylindrical surface, but for example to the axis of a hole drilled in it.

Given the high degree of accuracy required the problem is not easy to solve except by the use of special devices.

The collet chuck the subject of this invention seeks to solve precisely this problem.

It is characterised by a prehensile inner member capable of gripping the piece; an intermediate member coaxial to the first with a conical seating which slides axially causing the prehensile member to close on the piece to be machined; an outer casing integral with the prehesile member and fitted around its periphery, with radial play, with an outer ring. This outer casing and ring can be compressed against each other and thus locked by friction by means of spring members of variable tension and unlocked by means of pushers operated axially by a thrust member.

In one preferred form of the invention this inner prehensile member, which is capable of gripping the work piece to be machined, has an extension at the lower end with a seating which contributes to perfect centring, where the upper cavity or hole corresponds to the axis of centring of the work piece to be machined.

The present invention also comprises a method for centring the collet chuck as in the above form of the invention. The characteristic of this method is the use of a centring apparatus consisting of two opposed coaxial pistons which can move towards each other, of which one is inserted into the aforementioned lower seating and the other into the upper hole or cavity in the work piece to be machined.

Embodiments of the invention will now be described, by way of example, with reference to the accompanying drawings, wherein FIG. 1 shows, in partial cross section, one embodiment of the invention;

Figure 1:
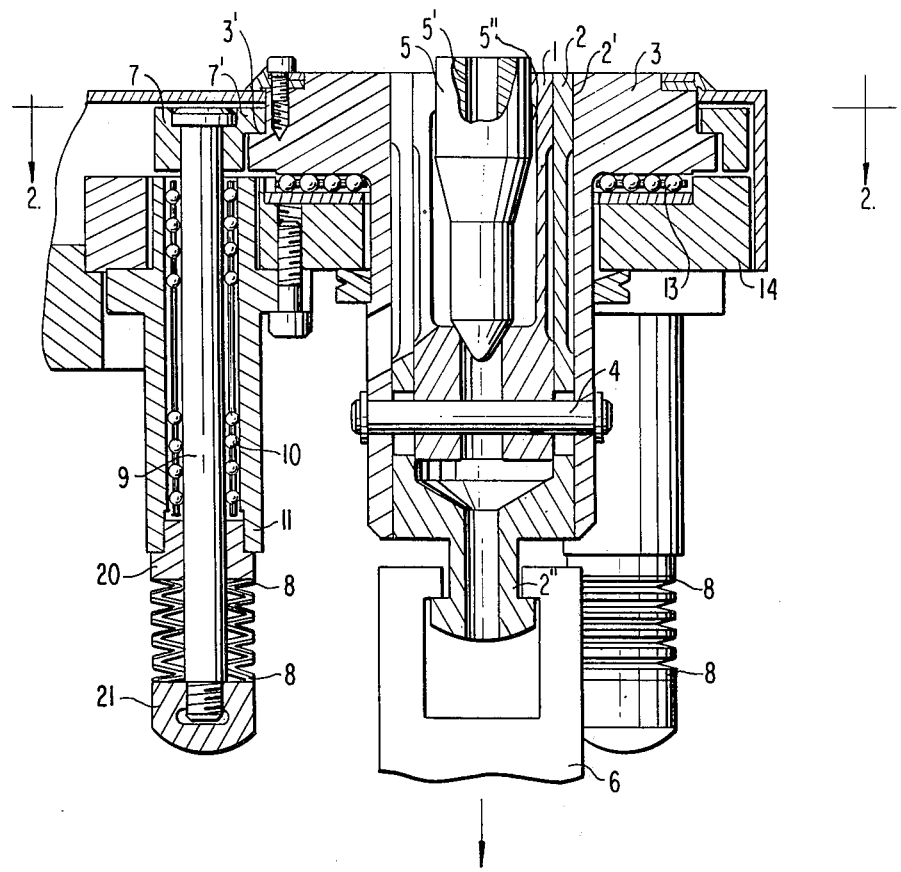

The collet chuck in question (FIGS. 1, 2 and 3) comprises: an inner prehensile member 1 (FIG. 1) which is capable of gripping the work piece to be machined 5, in which the central hole 5', owing to defects in previous machining, is not coaxial with the outer cylindrical surface 5'', or whose interior is purposely eccentric relative to the outer surface.

Outside the prehensile member 1 and coaxial to it is the intermediate member 2, of which the outer surface 2' is conical and fits the corresponding conical surface of the casing 3.

At the lower end of this intermediate member 2 is a hooked section which is pulled by the connecting rod 6 so as to close the prehensile member 1 onto the work piece 5.

Outside the intermediate member 2 is the outer casing 3 which is secured to the prehensile member 1 by means of a transverse pin 4 so as to eliminate relative movement radially or axially between the prehensile member 1 and casing 3.

The outer casing 3 is fitted, around its periphery, with ample radial play greater than the expected maximum eccentricity of workpiece hole 5 relative to surface 5', with the outer ring 7. The two are coupled by means of the upper projection 7' on the ring and the corresponding groove 3' on the casing 3.

The outer ring 7 has three pushers 9 consisting of three axial pins placed at 120° intervals, sliding without radial play on balls contained within three tubes 11.

Coaxially with each pin 9 are cup springs 8, the pressure of which can be regulated by turning the threaded bush 20 screwed onto the tube 11.

The lower plate 12 of the machine (FIG. 3) presses against the three threaded plugs 21.

The outer casing 3 is supported by the lower table 14 and between the two are placed parts to allow it to roll, in particular the balls 13, which allow the casing itself to rotate without friction.

Between the inner casing 3 and the outer ring 7 is placed a weak corrugated spring 16 (FIG. 2) which centres the bearing cage 13 when the ring 7 is raised.

The operation of the described arrangement is as follows. The lower plate 12 presses in the direction of the arrow 22 (FIG. 3) and the three pins 9 raise the ring 7 relative to the outer casing 3 allowing the latter to rotate and move laterally on the balls 13 within the limits of the radial play between ring 7 and casing 3 so that by placing the guide cone 15 into the hole 5' in the workpiece, the outer casing 3 is coaxial to the axis of the workpiece 5.

As is shown by the explanation given here, owing to the presence of the balls 10 which eliminate radial play, perfect centring of the collet chuck relative to the workpiece 5 is obtained; a contributing factor is that the balls 13 allow it to be positioned with minimum effort.

Given the wide diameter of the casing 3 corresponding to its periphery 3', that is where it meets the ring 7, the torque friction resistance between the two surfaces 7' and 3' when in contact is considerable and sufficient to ensure the immobility of the piece 5 in the collet during machining.

It is obvious that in the case of a machine with a number of successive machine positions, once the workpiece has been centred relative to the collet chuck at the start of a machining operation, the position of the workpiece will remain unchanged, thereby eliminating all tolerances not only of the workpiece but also those relative to the eccentricity of the collet chuck itself.

The centring of the collet chuck on the axis of the piece to be machined is moreover immediate and requires very little time. Hence the collet chuck in question is extremely useful in mass production machining where the time taken is of particular importance.

Finally, it may be noted that when positioned, it is possible to rotate the collet casing 3 after raising ring 7 by means of the positioner 15A in order to shift the point of contact of the balls relative to the casing itself.

Figures 4, 5:
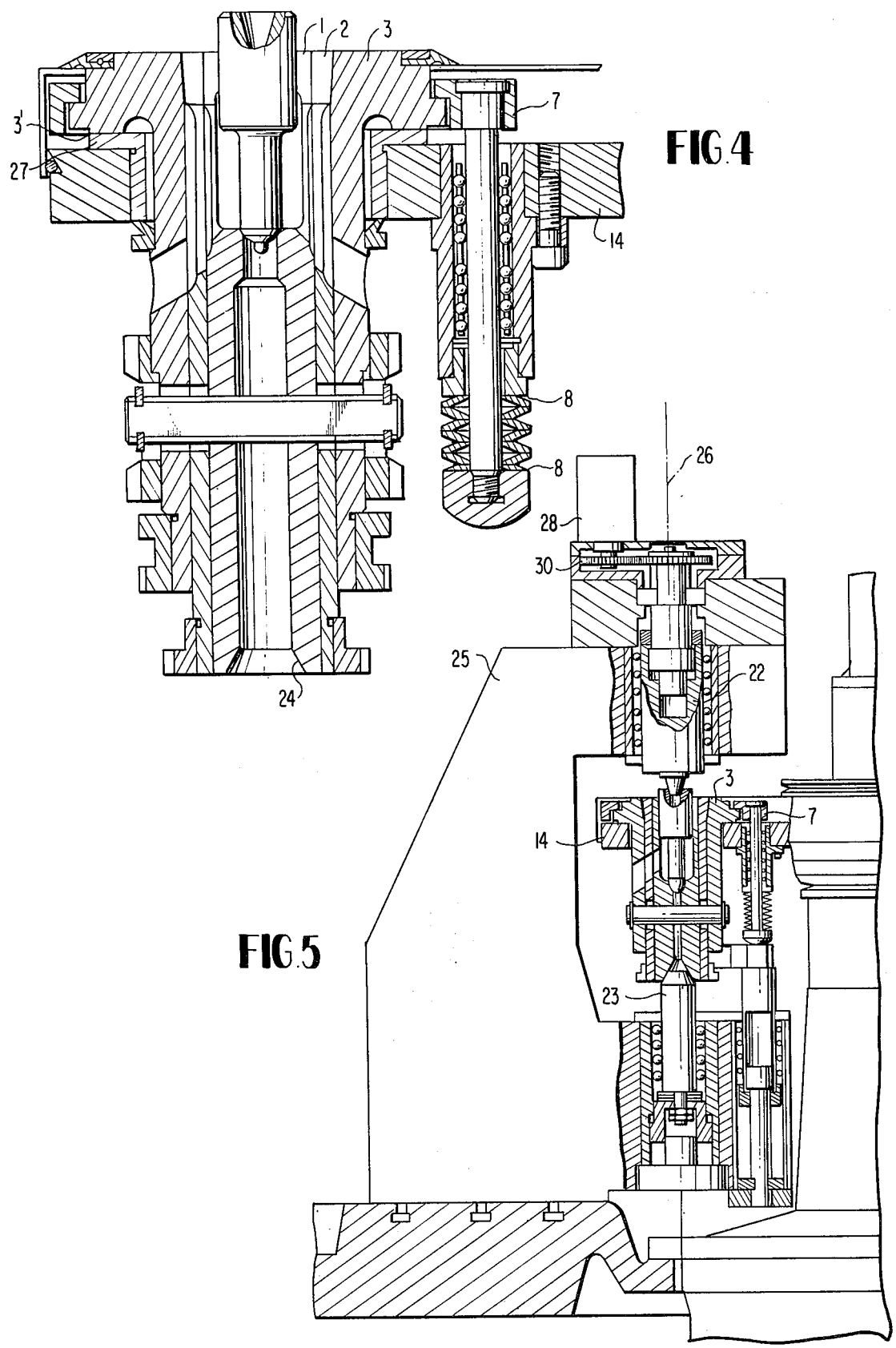
FIG. 4 shows in a cross section a second embodiment of the invention.
FIG. 5 shows the embodiment of FIG. 4 when in operative position in relation to the machine.

In the second embodiment, shown in FIGS. 4 and 5 the locking system and the operation of the collet is identical to that described above.

In this case, the outer casing 3 has a special feature, namely an extension corresponding at the lower end to a truncated cone seating 24 perfectly centred relative to the axis of the collet chuck itself.

The procedure for centring is carried out by means of the apparatus shown in FIG. 5.

The apparatus consists of two pistons 22–23 of which the upper one 22 is centred on the axis of the workpiece 5 and the lower one 23 is centred on the axis of the truncated cone seating 24 of the inner prehensile member 1 of the collet chuck.

Figure 2:
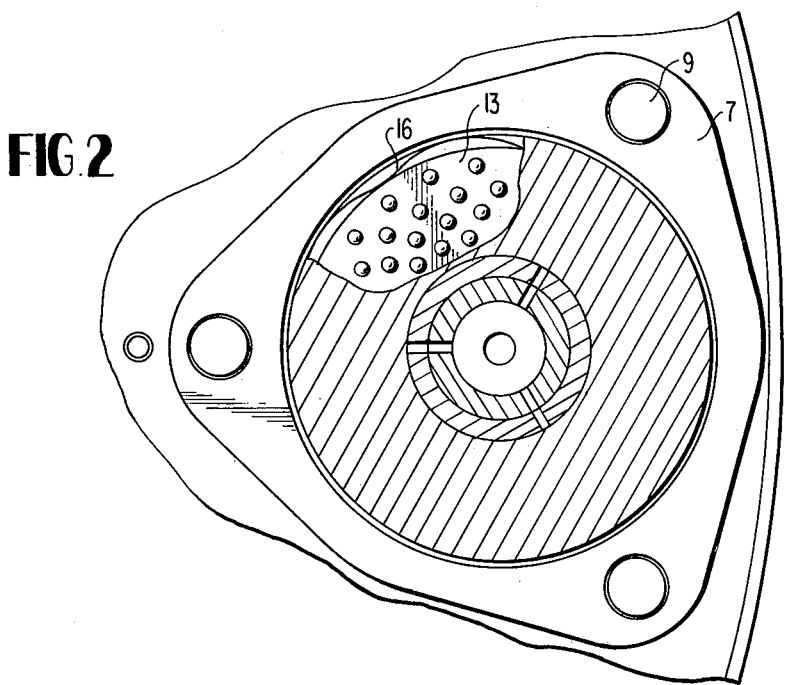
FIG. 2 shows a plan of the embodiment of the invention drawn in FIG. 1.
Figure 3:
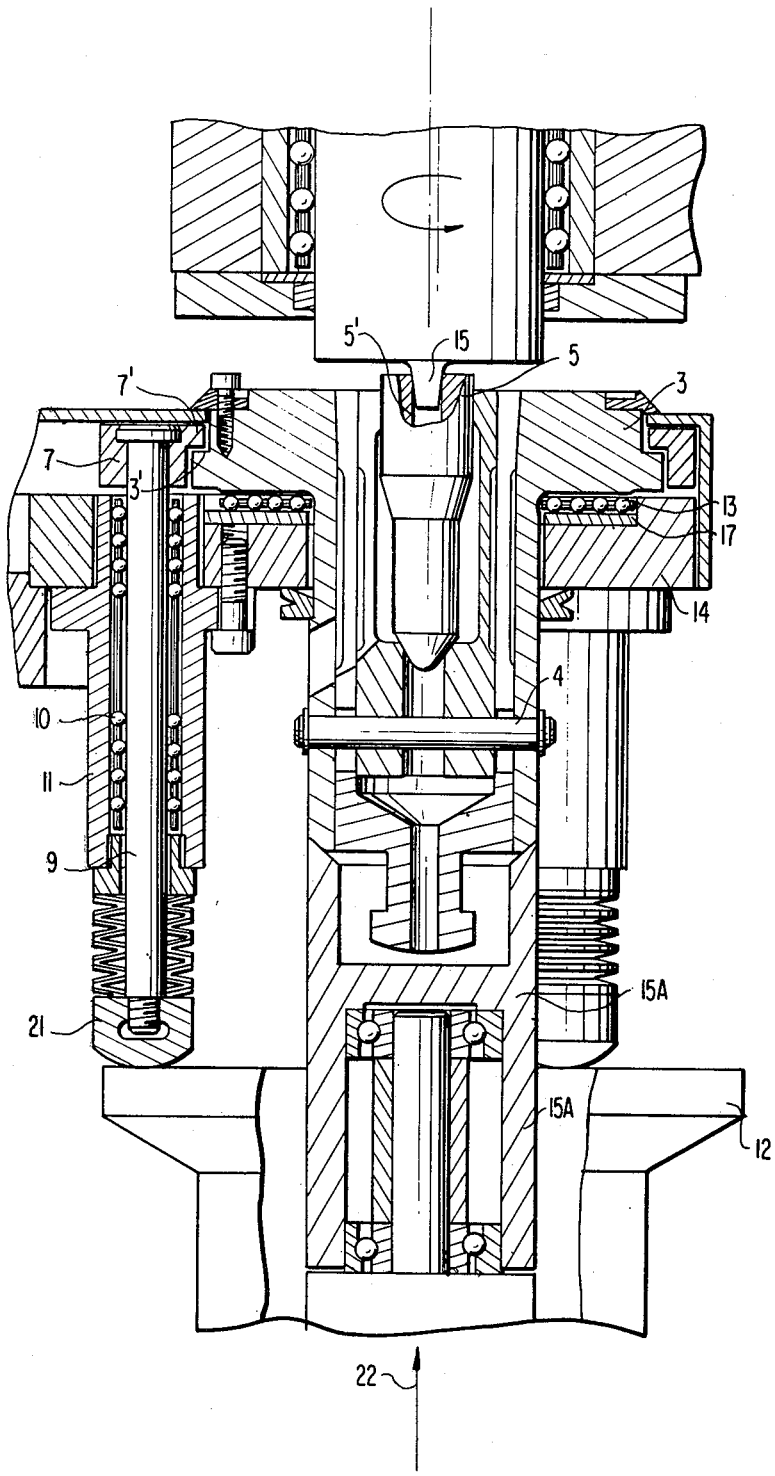
FIG. 3 shows the embodiment of the invention shown in FIG. 1, in identical view to that of FIG. 1, but also in operative position in relation to the machine tool.

The collet casing 3 is unlocked in exactly the same way as described with reference to FIGS. 1 to 3, thereby allowing the two pistons 22–23 to align the axis of the workpiece to be machined 5 and the inner casing of the collet relative to the axis 26.

Moreover, piston 23 is controlled by a slightly higher pressure than piston 22 so that the casing 3 is slightly detached from the surface of the plate 27, whilst still remaining disengaged from the locking ring 7.

At this point, it is possible to rotate through any angle, the whole collet casing system by means of the mechanism which consists of the hydraulic motor 28, and the geared transmission 30. The advantage of this is that it is possible to vary the points of contact between the plate 27 and the collet casing surface 3'.

Piston 23 is then retracted to its original position while pressure is maintained on piston 22 so as to re-establish contact between the collet casing 3 and the plate 27; the collet casing 3 is then locked by the ring 7 as described.

This variation is particularly suited for workpiece similar in shape to that shown in the drawing in FIG. 4.

I claim:

1. A collet chuck which can be centered relative to an axis of the workpiece to be machined and suitable for machine tools in general and in particular machine tools having a number of successive positions characterized by an inner prehensile member (1) capable of gripping the workpiece, an intermediate member (2) coaxial to the first with a conical seating which slides axially causing the prehensile member (1) to close on the workpiece to be machined (5); an outer casing (3) rigidly attached to the prehensile member (1) by means of a pin (4), an outer ring (7) fitted with radial play around the periphery of outer casing (3), spring members (8) of variable tension to compress the outer casing (3) and outer ring (7) against each other to lock them together by friction, pusher means (9) operable axially by a thrust member to unlock said outer casing and said outer ring, and a positioner (15) that enters the outer casing (3) so as to shift it angularly.

2. A collet chuck which can be centered relative to an axis of the workpiece to be machined and suitable for machine tools in general and in particular machine tools having a number of successive positions characterized by an inner prehensile member (1) capable of gripping the workpiece, an intermediate member (2) coaxial to the first with a conical seating which slides axially causing the prehensile member (1) to close on the workpiece to be machined (5); an outer casing (3) rigidly attached to the prehensile member (1) by means of a pin (4), an outer ring (7) fitted with radial play around the periphery of outer casing (3), spring members (8) of variable tension to compress the outer casing (3) and outer ring (7) against each other to lock them together by friction, pusher means (9) operable axially by a thrust member to unlock said outer casing and said outer ring, and a positioner (15), said inner prehensile member (1) which is capable of gripping the piece to be worked having an extension at the lower end with a seating (24) which contributes to accurate centering, said seating (24) being a truncated cone which matches a truncated cone ending of a piston (23) which enters it.

3. A collet chuck which can be centered relative to an axis of the workpiece to be machined and suitable for machine tools in general and in particular machine tools having a number of successive positions characterized by an inner prehensile member (1) capable of gripping the workpiece, an intermediate member (2) coaxial to the first with a conical seating which slides axially causing the prehensile member (1) to close on the workpiece to be machined (5); an outer casing (3) rigidly attached to the prehensile member (1) by means of a pin (4), an outer ring (7) fitted with radial play around the periphery of outer casing (3), spring members (8) of variable tension to compress the outer casing (3) and outer ring (7) against each other to lock them together by friction, pusher means (9) operable axially by a thrust member to unlock said outer casing and said outer ring, and a positioner (15), said inner prehensile member (1) having an extension at the lower end with the seating (24) which contributes to accurate centering, and the centering apparatus comprising two opposed coaxial pistons (22, 23) which can move toward each other, of which one enters said lower seating (24) and the other an upper cavity (5') in the workpiece to be machined.

4. A collet chuck as in claim 3, said pistons (22, 23) having truncated cone ends and running on sliding ball bearings and being operated hydraulically independently of each other.

5. A collet chuck as claimed in claim 3, and means for exerting greater pressure on the lower of said pistons to achieve a slight initial raising of the collet casing until it is detached from a surface (3') of a plate (27) on which it rests, thereby making it possible to align accurately the axis of the workpiece to be machined with that of the inner casing (3) of the collet chuck, after which the collet casing (3) is rotated through a certain angle so as to vary its points of contact with said plate (27) and finally the lower piston is retracted to its original position, while pressure is maintained on the upper piston (22) in order to re-establish contact between the collet casing (3) and the plate, after which the collet casing (3) can be locked by means of said outer ring (7).

6. A collet chuck as claimed in claim 5, and a hydraulic motor (28) acting through a geared transmission (30) to shift said collet casing (3) angularly.

* * * * *